(12) United States Patent
Kalyani (10) Patent No.: US 9,752,203 B2
(45) Date of Patent: Sep. 5, 2017

(54) PROCESS TO IMPROVE FATIGUE STRENGTH OF MICRO ALLOY STEELS, FORGED PARTS MADE FROM THE PROCESS AND AN APPARATUS TO EXECUTE THE PROCESS

(71) Applicant: Babasaheb Neelkanth Kalyani, Pune (IN)

(72) Inventor: Babasaheb Neelkanth Kalyani, Pune (IN)

(*) Notice: Subject to any disclaimer, the term of this patent is extended or adjusted under 35 U.S.C. 154(b) by 458 days.

(21) Appl. No.: 14/350,082

(22) PCT Filed: Oct. 3, 2012

(86) PCT No.: PCT/IB2012/055290
§ 371 (c)(1),
(2) Date: Apr. 7, 2014

(87) PCT Pub. No.: WO2013/050936
PCT Pub. Date: Apr. 11, 2013

(65) Prior Publication Data
US 2014/0261921 A1    Sep. 18, 2014

(30) Foreign Application Priority Data
Oct. 7, 2011    (IN) .................. 2852/MUM/2011

(51) Int. Cl.
*C21D 1/02* (2006.01)
*C21D 1/18* (2006.01)
(Continued)

(52) U.S. Cl.
CPC .............. *C21D 1/18* (2013.01); *C21D 1/02* (2013.01); *C21D 1/42* (2013.01); *C21D 7/13* (2013.01);
(Continued)

(58) Field of Classification Search
CPC ...... C21D 1/02; C21D 1/18; C21D 2211/001; C21D 7/13; C21D 9/30; F16C 3/06
(Continued)

(56) References Cited

U.S. PATENT DOCUMENTS 5,108,699 A * 4/1992 Bodnar ................. C22C 38/46
148/335
5,716,468 A * 2/1998 Tanaka ..................... C21D 1/78
148/649

(Continued)

FOREIGN PATENT DOCUMENTS

EP    1978124 A1 * 10/2008
EP    2169082 A1    3/2010
(Continued)

OTHER PUBLICATIONS

Abstract of KR 2009/0049638; May 2009; 1 page.*
(Continued)

*Primary Examiner* — Helene Klemanski (57) ABSTRACT

The present invention describes a process to make enhanced fatigue strength micro-alloy steel. In the process of the present invention, the soaking temperature is maintained in the range of 900° C. to 1050° C. and soaking time in the range of 30-60 minutes depending on size of crankshaft to get refined grain size. Distortion of the components is prevented from occurring with provision of adequate supports especially designed for the process. Forged parts made using the process, such as crankshafts, have a refined grain pattern and result into 20 to 25% enhancement in torsion fatigue strength & 10-25% enhancement in bending fatigue strength. The present invention thus provides an enhanced ratio of the strength to material density and a micro-alloy whose torsion fatigue strength and bending fatigue strength are greater than the currently available micro-alloy steels.

11 Claims, 6 Drawing Sheets

(51) Int. Cl.
*C21D 7/13* (2006.01)
*C21D 9/30* (2006.01)
*F16C 3/06* (2006.01)
*C21D 1/42* (2006.01)

(52) U.S. Cl.
CPC .................. *C21D 9/30* (2013.01); *F16C 3/06* (2013.01); *C21D 2211/001* (2013.01); *Y02P 10/253* (2015.11)

(58) Field of Classification Search
USPC .................................. 148/660, 662; 266/249
See application file for complete search history.

(56) References Cited

U.S. PATENT DOCUMENTS

| | | | | |
|---|---|---|---|---|
| 6,074,169 A * | 6/2000 | Siga | ...................... | C22C 38/001 415/200 |
| 8,343,255 B2 | 1/2013 | Abiko et al. | | |
| 2007/0068607 A1* | 3/2007 | Huff | ........................ | C21D 1/18 148/663 |
| 2010/0006189 A1* | 1/2010 | Larker | ..................... | C21D 5/00 148/548 |
| 2010/0081004 A1* | 4/2010 | Abiko | ....................... | C21D 7/13 428/544 |
| 2011/0114229 A1* | 5/2011 | Perry | ..................... | C21D 8/021 148/547 |
| 2012/0152413 A1* | 6/2012 | Parolini | ................... | C21D 1/20 148/539 |

FOREIGN PATENT DOCUMENTS

EP        2357262 A1      8/2011
JP      2010189697 A      9/2010

OTHER PUBLICATIONS

English translation of KR 2009/0049638; May 2009; 6 pages.*
Degarmo, E. Paul; Black, J T.; Kohser, Ronald A. (2003), Materials and Processes in Manufacturing (9th ed.), Wiley, ISBN 0-471-65653-4, p. 44 (point No. 24).

* cited by examiner

Figure 3b – Case 2

Figure 3a – Case 1

Figure 4a – Case 1

Figure 3c – Case 3

Figure 4c – Case 3

Figure 4b – Case 2

PROCESS TO IMPROVE FATIGUE STRENGTH OF MICRO ALLOY STEELS, FORGED PARTS MADE FROM THE PROCESS AND AN APPARATUS TO EXECUTE THE PROCESS

FIELD OF INVENTION

This invention is related to the field of steels; in particular the invention relates to improving the fatigue strength of micro-alloy steels.

BACKGROUND OF THE INVENTION

Crankshaft is supposed to be the heart of engine. Crankshaft converts reciprocating motion of piston into rotational motion. Crankshaft has complex geometry and it also experiences large number of load cycles during its service life. Therefore fatigue performance and durability are key considerations in crankshaft design and performance. During its service life, a crankshaft operates under high forces resulting from fuel combustion. The combustion and mass Inertia forces acting on the crankshaft cause two types of fluctuating loadings on the crankshaft structure i.e. torsional load and bending load. Hence a crankshaft requires high torsional and bending fatigue strength.

The designers of modern internal combustion engines are facing the challenge of reducing the environmental pollution to meet strict pollution control regulations all over the world. Environmental pollution can be reduced through improving engine efficiency. The crankshaft design is crucial in deciding the engine efficiency along with higher strength to weight ratio. Environmental compliance norms (for example, Euro norms) are becoming more and more stringent leading to tighter engine designs as a consequence of which the pressures to which engine cylinder are designed is much higher than a few years ago. To withstand this increase in pressure, crankshaft demands higher torsional and bending fatigue strength.

There is a constant search for high strength materials to cope with these demanding situations. One such high strength material category, the micro-alloy (MA) forging steel, has been finding increasing usage for gasoline and diesel engine crankshafts. Micro-alloy steel, also termed as micro-alloyed steel, is a type of steel that contains small amounts of alloying elements (0.05 to 0.15%). Standard alloying elements include: Niobium, Vanadium, Titanium, Molybdenum, Zirconium, Boron, and rare-earth metals. They are used to refine the grain microstructure and/or facilitate precipitation hardening.

The performance and cost of these steels lies between carbon steel and low alloy steel. Yield strength is between 500 and 750 MPa (73,000 and 109,000 psi) without heat treatment. Fatigue life and wear resistance are superior to those for similar but heat treated steels. The known disadvantages of the micro-alloy steels are that their ductility and toughness are not as good as quenched and tempered (Q and T) steels.

As a part of their forming process, the Micro-alloy steels must also be heated hot enough for the all of the alloys to be in solution. After forming, the material must be quickly cooled to 540 to 600° C. (1,004 to 1,112° F.) for grain refinement and at the same time cooling should be slow enough to ensure complete precipitation strengthening. The success of micro alloyed steels is due to strengthening mechanisms, specifically grain refinement and precipitation hardening.

Most new crankshaft applications specify micro-alloy steel, and many current applications are changing over from cast iron, or forged and heat treated plain carbon or alloy steels, to as-forged micro-alloy steels. Micro-alloy (MA) or high strength low alloy (HSLA) steel is an important development in the steel production and is used in every major steel market in various parts of world and the same has played an important role in expansion of industries such as oil and gas extraction, construction and transportation.

Figure 1:
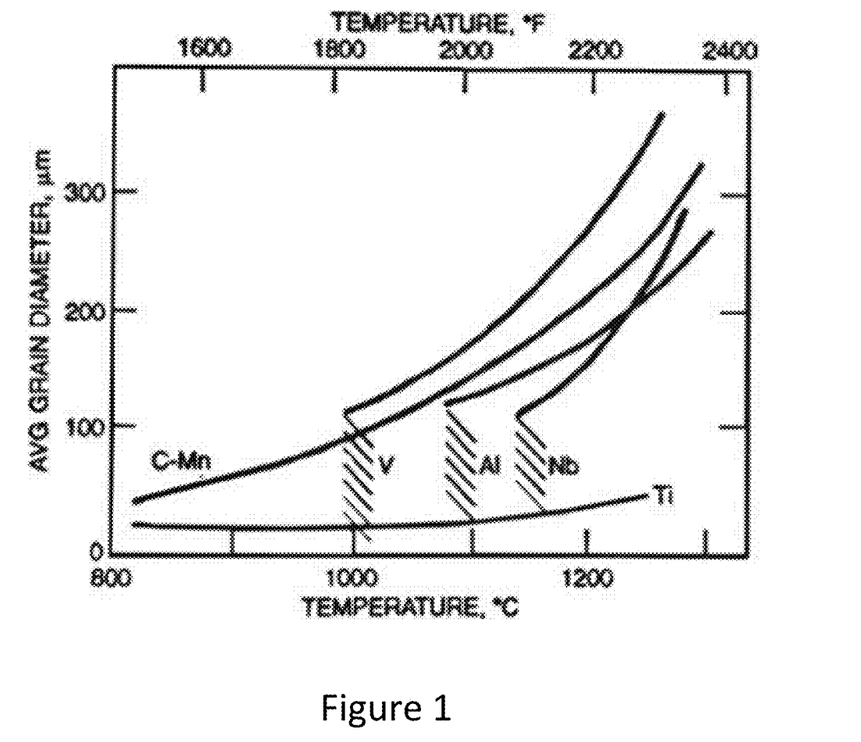
FIG. 1 shows effect of alloying elements on grain coarsening.

A variant of the MA steels, the Vanadium micro-alloyed steels tend to be coarser grained than the equivalent grade C38+N2 steels which do not contain Vanadium as shown in FIG. 1. It is therefore important to control the grain size using an optimum cooling rate from the forge temperature to refine grain size using a simple heat treatment which does not result in much distortion. Grain refinement process is one such treatment.

During forging process billets are heated up to 1280° C. It is observed from FIG. 1 that at the forging temperature the average grain diameter is more than 350 µm as represented by an equivalent ASTM grain size number of 0-1. Subsequently recrystallization takes place and new grains are formed. These grains are coarser (ASTM 3-5). It is known that with increase in grain size the endurance limit decreases. So it is essential to maintain fine grain size for better fatigue strength. In the case of a fine grained structure, the dislocation movement is restricted due to the increased amount of grain surface area whereby increased strength is achieved. Hence steel with fine grain size results into higher fatigue strength.

Figure 1A:
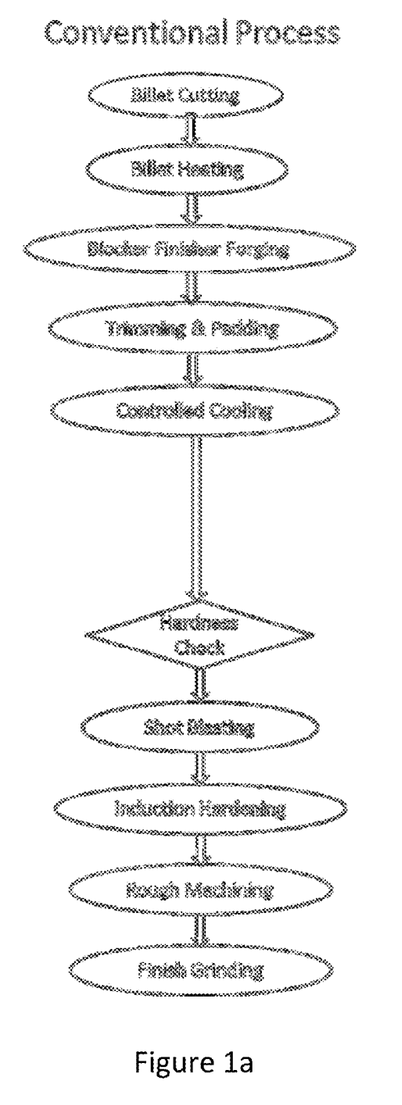
FIG. 1a shows flow diagram for the conventional process of forged manufacturing of parts such as crankshaft.

FIG. 1a shows a conventional micro-alloyed steel crankshaft manufacturing process deploys a forging operation followed by controlled cooling. The entire process comprises the steps of billet forming, forging followed by controlled cooling, checking the product for hardness, forming the final part through machining. Grain size obtained with this process is in the range of ASTM 3-5. Components such as crankshafts manufactured with this process are subsequently machined, induction-hardened, ground and tested for fatigue strength. Observed torsion fatigue strength of such crankshafts is between 95 to 100 MPa, and the bending fatigue strength is 3649 micro strain (839 MPa).

OBJECTS AND ADVANTAGES OF THIS INVENTION

The present invention aims to provide an enhanced ratio of the strength to material density and to provide a micro-alloy whose torsion fatigue strength and bending fatigue strength are greater than the currently available micro-alloy steels.

SUMMARY OF THE INVENTION

The present invention describes a process to make enhanced fatigue strength micro-alloy steel. In the process of the present invention, the soaking temperature is maintained in the range of 900° C. to 1050° C. and soaking time in the range of 30-60 minutes depending on size of crankshaft to get refined grain size. Distortion of the components is prevented from occurring with provision of adequate supports especially designed for the process.

Crankshafts with refined grain according to the process of the present invention resulted into 20 to 25% enhancement in torsion fatigue strength and 10-25% enhancement in bending fatigue strength.

Description of Technical Terms:

Billet Cutting: Saw-cutting of the cold bar to required size.

Billet Heating: Heating of billet to a predefined temperature (1285+/−25° C.) in furnace followed by water descaling to remove scale on billet.

Forging: A term used to collectively describe the steps of Rolling, Blocker, Finisher, and Trimming, each of which are described below.

Rolling: A process to generate preform shape between rolls with predefined reduction to obtain required length and optimize input material.

Blocker: Rough shape forming between two dies prior to finisher with predefined energy.

Finisher: Forming final shape between dies with predefined energy.

Trimming: Clipping of extra material (Flash) on finisher forging along the parting line to achieve final product shape.

Padding: Calibrating final forging to achieve required dimensions.

Grain Refinement: Refinement of grain is the most important and the most essential method for the control of microstructures in materials. There are such methods to obtain fine grain as heat treatment by the use of Phase transformation and recrystallization.

Hardness Check: Hardness is defined as "Resistance of metal to plastic deformation, usually by indentation". It is the property of a metal which gives the ability to resist being permanently deformed, when a load is applied. The greater the hardness of the metal, the greater resistance it has to deformation.

Shot Blasting: Steel shot blasting is the most widely used process for cleaning, stripping and improving a metal surface finish after metal working operation (Forging).

Rough Machining: Machining can be defined as the process of removing material from a work piece in the form of chips. Machining is necessary where tight tolerances on dimensions and finishes are required.

Induction Hardening: Induction hardening is to provide a fully-martensitic layer on the surface to certain depth of the crankshaft to increase hardness and wear resistance, while allowing the remaining part of crank to be unaffected by the process. The increase in hardness also improves contact fatigue strength.

Finish Grinding: A grinding process is used for producing very fine finishes, making very light cuts, or high precision forms using an abrasive wheel as the cutting device.

DETAILED DESCRIPTION OF THE INVENTION

Figure 1B:
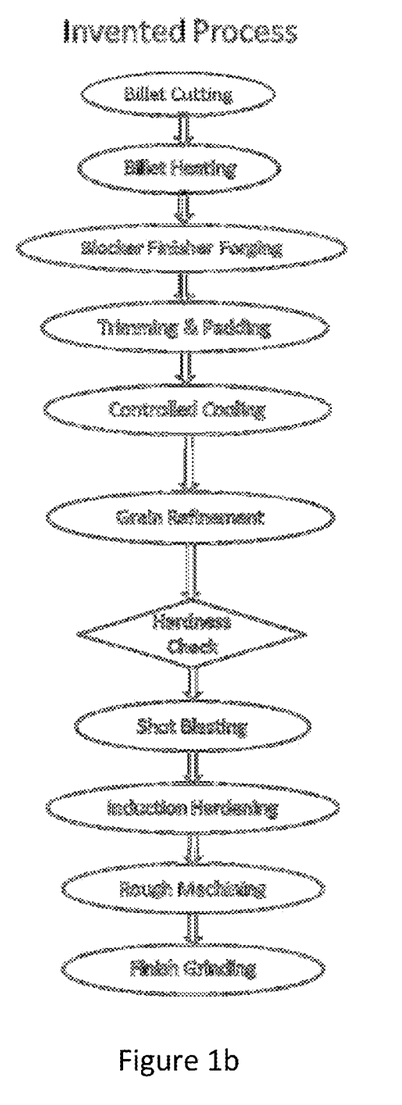
FIG. 1b shows flow diagram for the process of the present invention.

As is evident from FIG. 1b, a step of grain refinement is introduced in the conventional process of making forged parts in order to enhance strength to weight ratio of the part. In particular, the process of this invention is applied to crankshafts made from micro-alloy steel. A 20-25% enhancement in torsion fatigue strength and 10-25% enhancement in bending fatigue strength was observed in the case of the crankshaft manufactured using the process of the present invention.

A conventional forging process as shown in FIG. 1a comprises the steps of

Shaping of the billet to the required size and heating it

Forging the billet and applying controlled cooling

Checking the hardness of the forged part

Carrying out the steps of machining, induction hardening and finish grinding

A typical forging process is a thermo-mechanical treatment or a heat-treating process that is often considered from both thermal and micro structural standpoints. In the thermal sense, grain refinement process incorporates an austenitizing cycle followed by cooling in still or slightly agitated air. Typically, the component to be treated is heated to a temperature about 55° C. (100° F.) above the upper critical line of the Fe—C phase diagram, that is, above $Ac_3$ for hypo-eutectoid steels and above $A_{cm}$ for hyper-eutectoid steels. To be properly classed as a grain refinement process treatment, the heating portion of the process must produce a homogeneous austenitic phase (face-centered cubic crystal structure) prior to cooling.

The process of the present invention seeks to provide improved machinability, refinement of grain-structure, homogenization, and modification of residual stresses, whereby the fatigue limit of the material is improved. This is achieved through introducing a step of grain refinement in the conventional process of forging.

The technical challenges which the present invention aims to meet are:
1. To maintain the Hardness and Mechanical properties within given specification after grain refinement.
2. To maintain the straightness of the part (minimizing thermal distortion) necessary fixtures and support is required.

The process of the present invention is now described which meets the above technical challenges and provides certain advantages over the currently adopted methods treating micro-ally steels.

During the step of grain refinement as disclosed in FIG. 1b, the forged and controlled-cooled components are treated for enhanced torsional and bending fatigue strength by heating them above austenitic temperature i.e. in the range of 900-1050° C. and by keeping them at that temperature for a 'soaking period' of 30 to 60 minutes in order to homogenize the temperature throughout all parts of the components. The heated and soaked parts are then cooled to room temperature by still or forced air cooling depending on the cross section of the forging. Forced air cooling may be required for parts larger than 2.5" thickness.

Equipment used for this grain refinement process is periodically calibrated oil fired furnace equipped with thermocouples, temperature controller, time/temperature graphs, and necessary fixtures to avoid distortion and loading/unloading device.

Metallurgical test equipment used: Brinell Hardness Testing Machine, Universal Tensile Testing machine, Optical Microscope with Image Analysis facility etc.

Figure 2A:
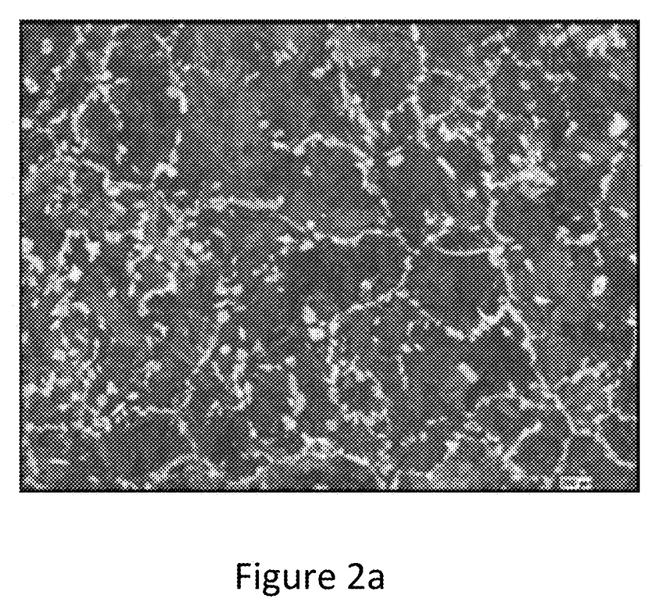
FIGS. 2a and 2b show grain size and surface hardness before and after grain refinement process for micro-alloy steel.
Figure 2B:
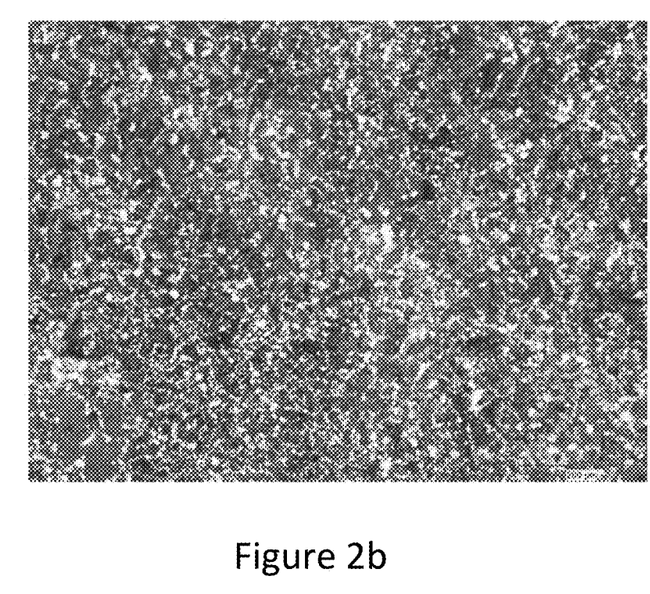

Grain size observed using optical microscope after grain refinement process of the present invention as applied to a crankshaft of diameter 95 mm at core is ASTM 6-8 whereas before the grain refinement process, it was ASTM 3-5 which is depicted in FIG. 2a and FIG. 2b.

The parts thus treated for refined grain size are next machined, induction hardened, ground and tested for fatigue strength.

Figure 3A:
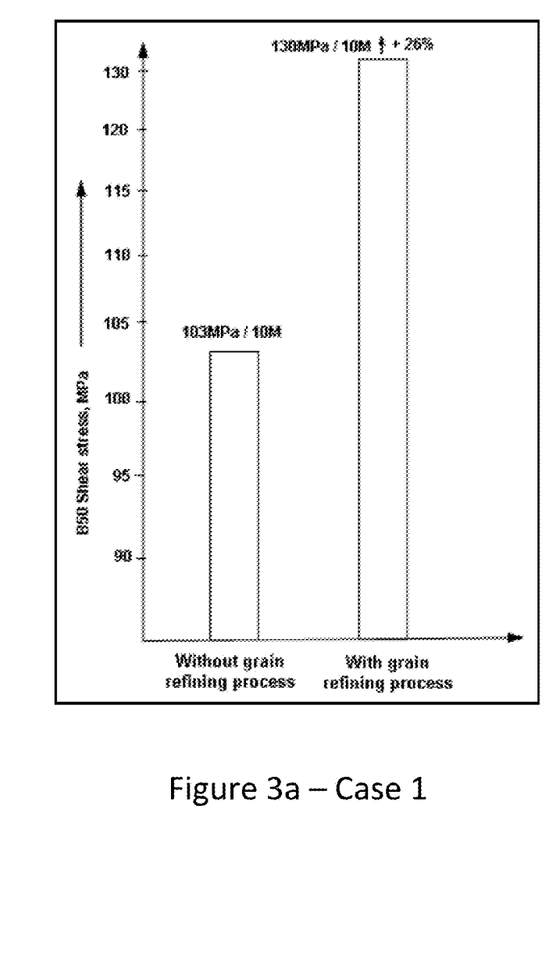
FIGS. 3a, 3b and 3c show crankshaft torsion fatigue strength comparisons before and after grain refinement process for different cases.
Figure 4A:
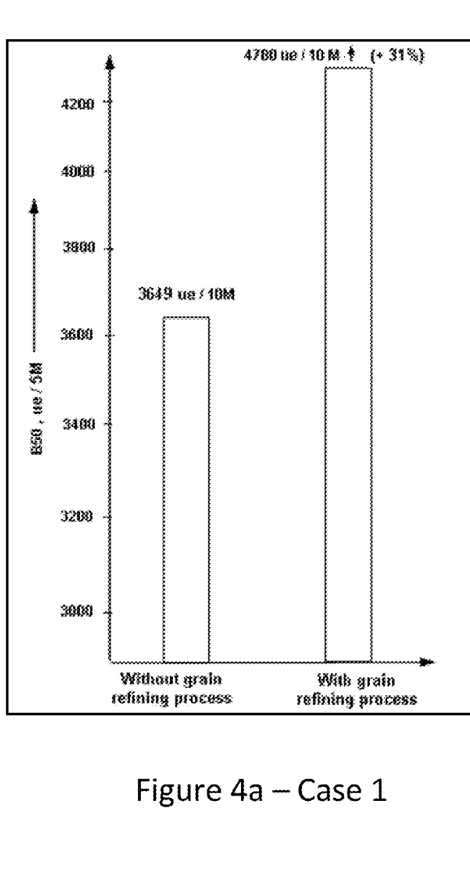
FIGS. 4a, 4b and 4c show crankshaft bending fatigue strength comparisons before and after grain refinement process.

Fatigue testing was carried out on samples of crankshafts of three different diameters (see table 1). Seven samples of each case (representing one diameter) were tested using staircase method where depending on test results of previous sample, load on preceding sample is either increased or decreased. Based on test results a statistical mean (B50) and standard deviation is estimated. Torsional fatigue strength observed after grain refinement process is 120 MPa to 130 MPa which is 20% to 26% higher than without grain refinement process as shown in FIG. 3a. Bending fatigue strength observed after grain refinement process is 4780 micro-strain (1100 MPa) which is 11% to 31% higher than without grain refinement process as shown in FIG. 4a.

TABLE 1

Crankshaft Details of cases discussed in this report:

| Case No. | Figure Number | Engine Capacity (Litres) |
| --- | --- | --- |
| 1 | 3a and 4a | 12.8 |
| 2 | 3b and 4b | 14 |
| 3 | 3c and 4c | 14.8 |

Achieving specified hardness after grain refinement was a big challenge. It is known to a person skilled in the art that grain refinement always reduces the hardness and ultimate tensile strength of the crankshaft. Therefore it would be undesirable to achieve too fine a grain size as the components would fail on the hardness, yield strength and ultimate tensile strength requirements.

It is also possible to coarsen the grains for achieving optimum mechanical properties by increase soaking time at high temperature or by increasing the austenitisation temperature. However, it is well known that both of these processes result in unacceptably high distortion of the components rendering them unusable in many instances. As such, establishing the soak time to homogenize the grain size without distortion was another challenging part of the heat treatment process of the invention.

Due to thermal cycle, it was difficult to maintain straightness of the parts, within given specification. Approximately 30% distortion after grain refinement observed due to inadequacy of fixture. This difficulty was eliminated by designing adequate support for each shaft during austenitisation, to avoid warpage.

Figure 3B:
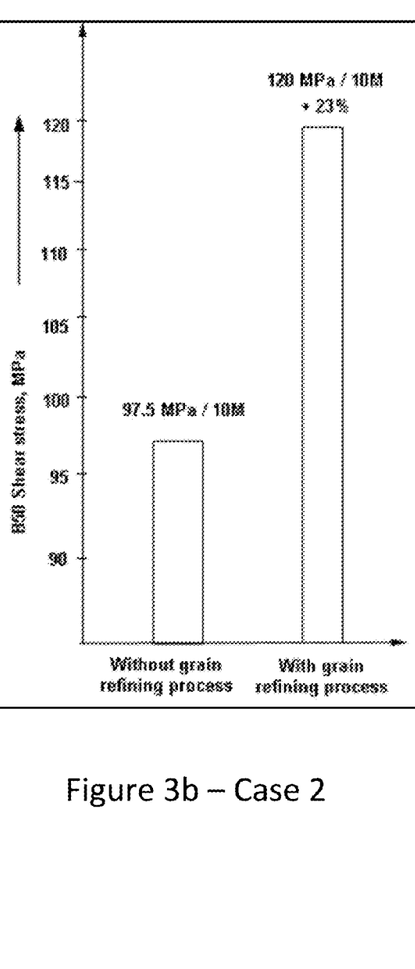
Figure 3C:
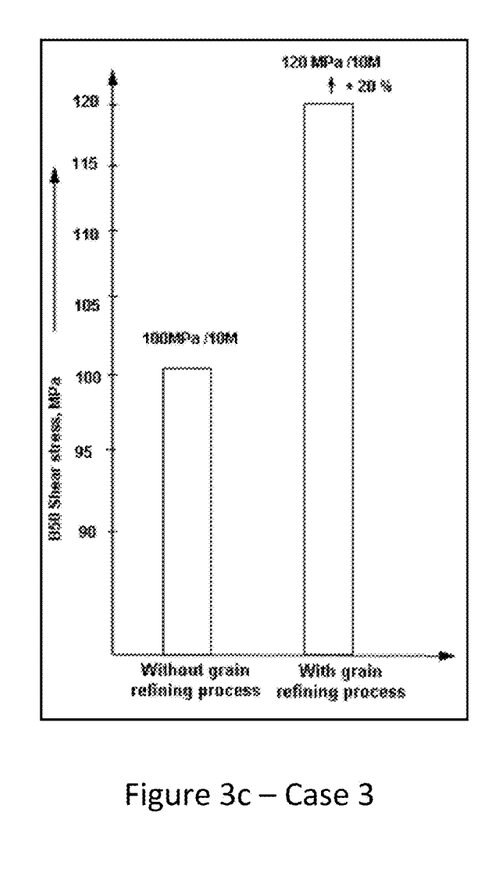
Figure 4B:
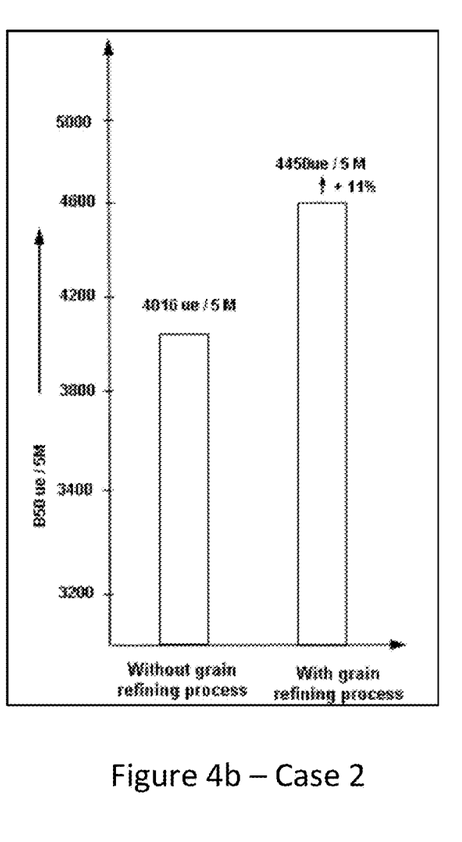
Figure 4C:
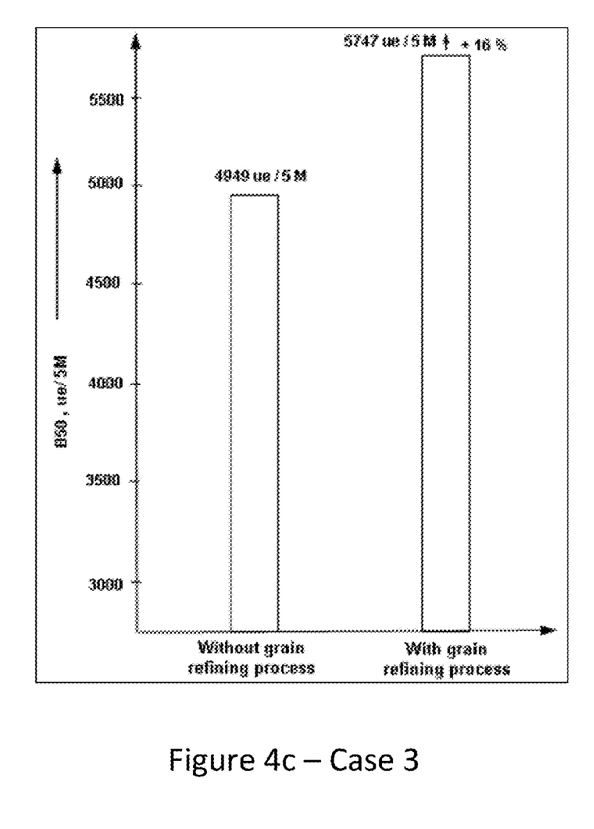

It can be observed from FIGS. 3a, 3b, and 3c, that the observed torsion fatigue strength for these crankshafts manufactured using the process of the invention is in the range of 20 to 25% higher than without grain refinement process as shown in FIGS. 3a, 3b and 3c. FIGS. 4a, 4b, and 4c, show the effect on bending fatigue strength of the process of the present invention. Bending fatigue strength of the material treated with the process of the present invention is also in the range of 10-15% higher than without grain refinement process as shown in FIGS. 4a, 4b and 4c.

Table 2 shows a comparison of the mechanical properties of micro-alloy steel before and after grain refinement process of the present invention.

TABLE 2

Comparison of mechanical properties before and after the grain refinement process

| Mechanical properties | Yield strength. (MPa) | Ultimate Tensile Strength (MPa) | % Elongation | % Reduction in CS area | Hardness HBW |
| --- | --- | --- | --- | --- | --- |
| Specification | 550 (Min.) | 850-1000 | 12 min. | 25 min. | 255-302 |
| Before Grain refinement process | 570-590 | 893-930 | 16-18 | 30-40 | 269-285 |
| After Grain refinement process | 570-583 | 853-863 | 19-22 | 45-55 | 255-269 |

From the above table it is noted that after grain refinement process the lowest ultimate tensile strength observed is 853 MPa, which is better than the minimum ultimate tensile strength (850 MPa) required for such components. Percentage reduction in the cross sectional area observed during the tensile strength carried out area after grain refinement process is high (45-55%) as compared to that before grain refinement process (30-40%) which indicates grain refining process induces high toughness in component which is beneficial for high fatigue strength.

It is evident from the foregoing discussion that the process of the present invention offers the following advantages:
1. Grain Refinement: grains are finer than those for the Q and T steels
2. Uniformness of structure throughout the section irrespective of section thickness.
3. Increase in toughness as is evident from increase in percentage reduction in the cross-sectional area.
4. Increase in the resistance of steel to fatigue crack initiation resulting from the increase of toughness increases, and the consequent increase in fatigue strength of the material.
5. Enhanced and consistent fatigue life.

The present invention thus discloses a heat treatment of vanadium micro-alloy steels which overcomes excessive grain coarsening during hot working and subsequent post-forge cooling treatment applied to the components being forged. At the same time, this treatment does not result into distortions associated with parts forged with conventional Q- and T steel. In the process of the present invention, the soaking temperature is maintained in the range of 900° C. to 1050° C. and soaking time in the range of 30-60 minutes depending on size of crankshaft to get refined grain size. Distortion of the components is prevented from occurring with provision of adequate supports especially designed for the process.

Crankshafts with refined grain according to the process of the present invention resulted into 20 to 25% enhancement in torsion fatigue strength and 10-25% enhancement in bending fatigue strength.

The success of components forged using micro alloyed steels with the process of the present invention is due to complimentary strengthening mechanisms, specifically grain refinement and precipitation hardening. Precipitation hardening increases strength but may contribute to brittleness.

It has been surprisingly found that the grain refinement process of the present invention not only increases strength but also improves toughness. As a result, grain refinement counteracts any embrittling caused by precipitation hardening.

It is evident from the foregoing discussion that the present invention comprises the following embodiments:
1. A process to improve fatigue strength of forged parts made from vanadium micro alloy steels, said process having a step of refining the grain size, said step of refining the grain size in turn comprising:
   austenitising said parts by heating them to a first temperature which is above austenitic temperature
   maintaining said parts at that temperature for a soaking period in order to allow said part to attain homogenized temperature, and
   cooling said parts to room temperature.
2. A process as described in embodiment 1 wherein said first temperature is in the range between 900-1050° C.
3. A process as described in embodiments 1 and 2, wherein said soaking period is of such duration which allows said part to attain a homogenized temperature throughout itself.
4. A process as described in embodiments 1 and 3, wherein said soaking period is 30 to 60 minutes.
5. A process as described in embodiments 1 and 4 wherein said cooling is applied by still or forced air cooling methods.
6. A process as described in embodiments 1 and 5, wherein during the austenitising, soaking and cooling stages, adequate warp-avoidance support is provided to each of said parts.
7. A forged part made from vanadium micro alloy steels said part having improved grain size obtained through a process of forging that includes a step of improving grain size, said step comprising:
   austenitising said parts by heating them to a first temperature which is above austenitic temperature
   maintaining said parts at that temperature for a soaking period in order to allow said part to attain homogenized temperature, and
   cooling said parts to room temperature.
8. A forged part as described in embodiment 7 wherein said first temperature is in the range between 900-1050° C.
9. A forged part as described in embodiments 7 and 8, wherein said soaking period is of such duration which allows said part to attain a homogenized temperature throughout itself.
10. A forged part as described in embodiments 7 to 9, wherein said soaking period is 30 to 60 minutes.
11. A forged part as described in embodiments 7 to 10 wherein said cooling is applied by still or forced air cooling methods.
12. A forged part as described in embodiments 7 to 11, wherein during the austenitising, soaking and cooling stages, adequate warp-avoidance support is provided to each of said parts.
13. An apparatus to make a forged part from vanadium micro alloy steels, said apparatus comprising at least a grain size refinement station wherein the steps of austenitising, soaking and cooling of forged parts are carried out.
14. A forged part made from vanadium micro alloy steels said part having improved grain size and structure, obtained through a process of forging that includes a step of improving grain size, said improved grain structure being a earlite structure said improved rain size being between ASTM 6-8 and said step comprising: austenitising said parts by heating them to a first temperature which is in the range between 900-1050° C., maintaining said parts at that temperature for a soaking period in order to allow said part to attain homogenized temperature, and cooling said parts to room temperature.

While the above description contains much specificity, these should not be construed as limitation in the scope of the invention, but rather as an exemplification of the preferred embodiments thereof. It must be realized that modifications and variations are possible based on the disclosure given above without departing from the spirit and scope of the invention. Accordingly, the scope of the invention should be determined not by the embodiments illustrated, but by the appended claims and their legal equivalents.

The invention claimed is:

1. A process to improve fatigue strength of forged parts made from vanadium micro alloy steels, said process having a step of refining the grain size, said step of refining the grain size in turn comprising: austenitising said parts by heating them to a first temperature which is in the range between 900-1050° C., maintaining said parts at that temperature for a soaking period in order to allow said part to attain homogenized temperature, and cooling said parts to room temperature.

2. A process as claimed in claim 1, wherein said soaking period is 30 to 60 minutes.

3. A process as claimed in claim 1, wherein said cooling is applied by still or forced air cooling methods.

4. A process as claimed in claim 3, wherein during the austenitising, soaking and cooling stages, warp-avoidance support is provided to each of said parts.

5. A forged part made from vanadium micro alloy steels said part having improved grain size and structure, obtained through a process of forging that comprises a step of improving grain size, said improved grain structure being a pearlite structure, said improved grain size being between ASTM 6-8, and said step comprising: austenitising said parts by heating them to a first temperature which is in the range between 900-1050° C., maintaining said parts at that temperature for a soaking period in order to allow said part to attain homogenized temperature, and cooling said parts to room temperature.

6. A forged part as claimed in claim 5, wherein said soaking period is 30 to 60 minutes.

7. A forged part as claimed in claim 5, wherein said cooling is applied by still or forced air cooling methods.

8. A forged part as claimed in claim 7, wherein during the austenitising, soaking and cooling stages, warp-avoidance support is provided to each of said parts.

9. An apparatus to make a forged part from vanadium micro alloy steels, said apparatus comprising at least a grain size refinement station wherein steps of austenitising, soaking and cooling of said forged part are carried out.

10. A process to improve fatigue strength of forged parts made from vanadium micro alloy steels, said process having a step of refining the grain size, said step of refining the grain size in turn comprising: austenitising said parts by heating them to a first temperature which is in the range between 900-1050° C., maintaining said parts at that temperature for a soaking period in order to allow said part to attain homogenized temperature, and cooling said parts to room temperature, wherein said soaking period is 30 to 60 minutes, and wherein said cooling is applied by still or forced air cooling methods.

11. A process as claimed in claim 10, wherein during the austenitising, soaking and cooling stages, warp-avoidance support is provided to each of said parts.

* * * * *